No. 740,011. PATENTED SEPT. 29, 1903.
A. W. HARVEY.
POTATO PLANTER.
APPLICATION FILED JULY 26, 1902.
NO MODEL. 2 SHEETS—SHEET 1.
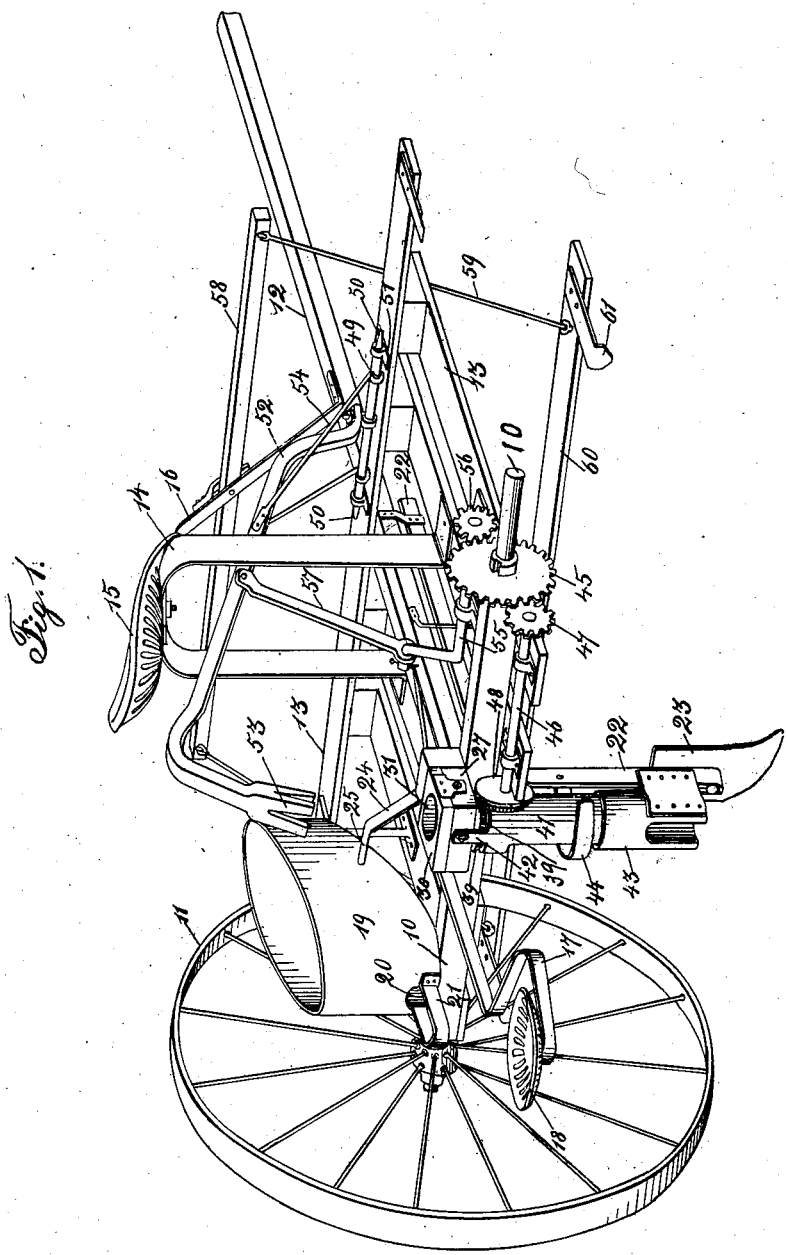
Witnesses:
Henry Manger
L. H. Orwig
Inventor: Arthur W. Harvey.
by Orwig & Lane Attys.

No. 740,011. PATENTED SEPT. 29, 1903.
A. W. HARVEY.
POTATO PLANTER.
APPLICATION FILED JULY 26, 1902.
NO MODEL. 2 SHEETS—SHEET 2.
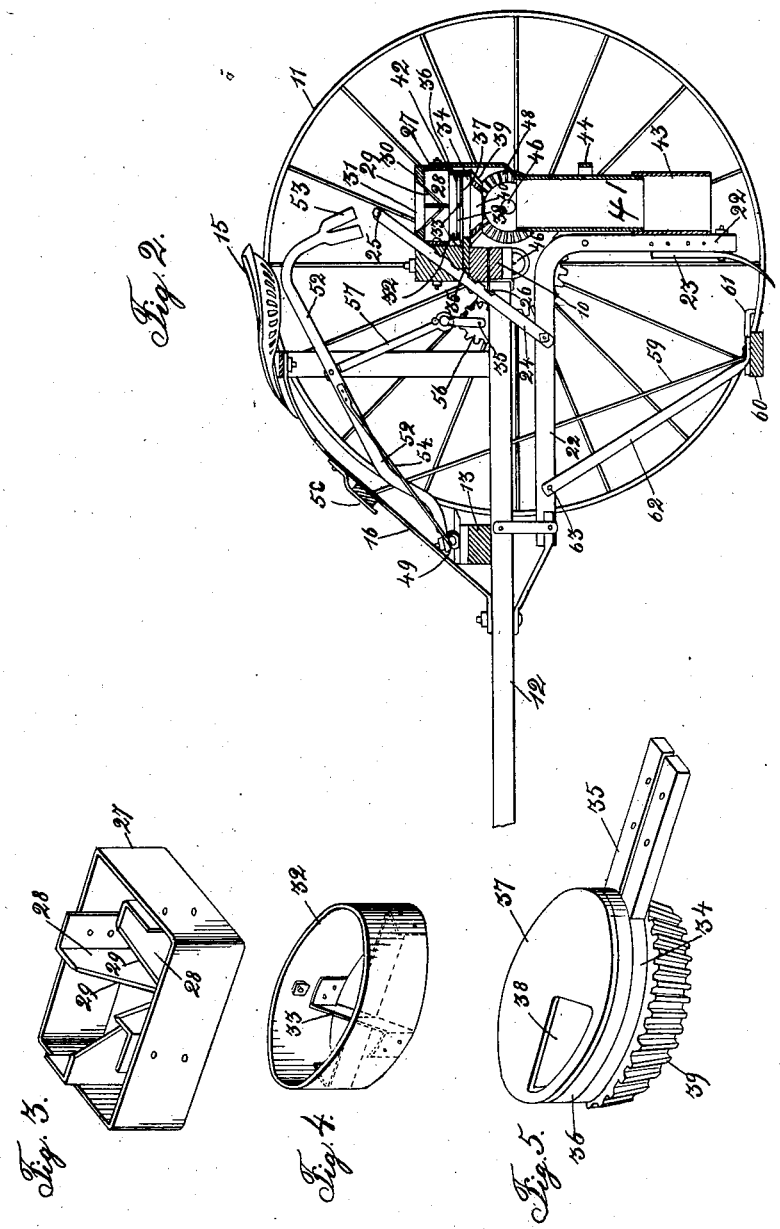
Witnesses:
Henry Manger.
L. H. Orwig.
Inventor: Arthur W. Harvey.
by Orwig & Lane Atty's.

No. 740,011. Patented September 29, 1903.

UNITED STATES PATENT OFFICE.

ARTHUR W. HARVEY, OF ALTOONA, IOWA.

POTATO-PLANTER.

SPECIFICATION forming part of Letters Patent No. 740,011, dated September 29, 1903.

Application filed July 26, 1902. Serial No. 117,092. (No model.)

*To all whom it may concern:*

Be it known that I, ARTHUR W. HARVEY, a citizen of the United States, residing at Altoona, in the county of Polk and State of Iowa, have invented certain new and useful Improvements in Potato-Planters, of which the following is a specification.

The objects of my invention are to provide a potato-planter of simple, durable, and inexpensive construction.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the complete machine with one of the traction-wheels and one of the potato-hoppers removed. Fig. 2 shows a vertical central longitudinal sectional view of the complete machine. Fig. 3 shows in perspective the potato-cutter. Fig. 4 shows in perspective the device for holding the severed portions of the potato separated from each other, and Fig. 5 shows in perspective the device for consecutively dropping the potato-sections.

Referring to the accompanying drawings, I have used the reference-numeral 10 to indicate the machine-axle upon which the traction-wheels 11 are rotatably mounted.

12 indicates the tongue, of ordinary construction, firmly connected with the machine-frame. The latter is indicated by the reference-numeral 13. Mounted upon the machine-frame is an arch 14 to support the driver's seat 15, and a brace 16 extends from the center of the arch downwardly and forwardly and is attached to the tongue.

The reference-numeral 17 indicates an arm rigidly secured to the machine-frame and projecting rearwardly therefrom and having an operator's seat 18 at its outer end.

Mounted upon the machine-frame near one end of the axle 10 is a hopper 19, having its bottom inclined downwardly and rearwardly and having an opening 20 at its rear lower face. Secured to the hopper is a small pocket 21, open at its top and arranged close to the operator's seat 18, and obviously the potatoes will pass one at a time through the opening 20 and may then be conveniently grasped by the operator, so that they may be placed in the potato-cutter, which will be hereinafter described.

Pivotally attached to the tongue 12 is a beam or standard 22, extending rearwardly and downwardly and having an ordinary furrow-opening shovel 23 at its lower end. Pivotally attached to the beam 22 is an arm 24, having notches on its rear face and a handle 25 at its top, and fixed to the tongue 12 is a pin 26, designed to enter the said notches, whereby the shovel-beam may be raised and lowered and supported in any desired position by placing one of the notches of the arm 24 in engagement with the pin 26.

The potato-cutting mechanism comprises a rectangular metal frame 27, supported in the rear of the central portion of the axle 10, and fixed in the interior of this frame 27 are two blades 28, each of which has a substantially V-shaped cutting edge 29 at its central portion, and the said blades are placed in the frame at right angles to each other. The top edges of the blades project a slight distance above the frame 27, and a detachable block 30, having a round opening 31 in its central portion, is mounted on top of the frame 27, with the blades partially embedded in its under surface to thereby hold the block firmly in position above the central portion of the cutting edges of the blades. Immediately beneath the frame 27 is a circular frame 32, having two upright partitions 33 fixed therein at right angles to each other, thus dividing the frame 32 into four compartments. This frame 32 is supported directly beneath the frame 27, and the partitions 33 are directly beneath the blades 28 and in line vertically with them.

The reference-numeral 34 indicates an annular collar having the outwardly-projecting ends 35. These ends are rigidly secured to the axle, and the annular collar projects rearwardly from the axle. This annular collar is fitted in a groove formed in the potato-dropping device, which is indicated by the reference-numeral 36. At the top of the potato-dropping device is a flat plate 37, having a triangular opening 38, which opening occupies substantially one-fourth of the top surface of the plate. On the lower end portion of the potato-dropping frame is a beveled gear-wheel 39, and the interior of the lower portion of this device has its sides tapering inwardly at 40 to form a chute through which the potatoes may drop into the planter-leg 41, which planter-leg is supported on the frame 27 by means of the strap 42. Directly beneath the part 41 is a cylindrical planter-leg portion 43 of a size to receive the part 41. This part 43 is firmly attached to the beam 22, and obviously as the beam is raised and lowered the part 43 moves up and down with it, and the lower end of the part 43 always remains at the same distance from the lower end of the furrow-opening shovel, and the potatoes drop through the planter-leg 41 and will also pass through the part 43 before entering the furrow. Attached to the beam 22 is a foot-rest 44, by which the operator on the seat 18 may apply pressure to the furrow-opening shovel to regulate the depth of the furrow.

Mounted upon the axle 10 is a cog-wheel 45, designed to be connected with the adjacent traction-wheel and to be rotated with the traction-wheel. Mounted upon the machine-frame 13 in the rear of the axle is a shaft 46, having a pinion 47 on one end and in mesh with the beveled gear-wheel 39, so that the potato-dropping device is constantly rotated during the advance of the machine over the ground-surface, thereby bringing the triangular opening 38 successively under each of the compartments in the frame 32.

The means for automatically forcing the potatoes between the blades 28 comprises a rock-shaft 49, having tapered ends 50, which tapered ends are mounted in the bearings 51, fixed to the front of the machine-frame. Fixed to the central portion of the rock-shaft 49 is an arm 52, projecting rearwardly and upwardly and then downwardly and having its rear end portion divided into four ends 53. The said arm 52 is braced against lateral movement by means of the braces 54, fixed to the arm, projected outwardly and forwardly and fixed to the rock-shaft 49. The said arm is so shaped and proportioned that when its rear end is moved downwardly it will pass through the opening 31 and its four ends will pass downwardly between the blades 28 and a short distance beyond them for purposes hereinafter made clear. This arm is automatically operated upon the advance of the machine as follows: Mounted upon the machine-frame in front of the axle 10 is a crank-shaft 55, having on one end a pinion 56, meshed with the cog-wheel 45, the said pinion being of the same size as pinion 47, and pivoted to the crank-arm of the shaft 55 is a pitman-rod 57, pivoted to the arm 52. By means of the construction just described it is obvious that the arm 52 is moved up and down once upon each complete revolution of the potato-dropping device.

My improved marker comprises, first, a bar 58, pivoted at its central portion upon the brace 16 and having the rods 59 pivoted to its end portions and extended downwardly and rearwardly. These rods 59 are connected at their lower ends with the marker-bar 60, which bar has at its end portions the markers 61. Fixed to the central portion of the marker-bar 60 is a brace 62, the upper end of which is pivoted at 63 to the beam 22, thus preventing longitudinal movements of the bar 60 and yet permitting the bar to tilt slightly, so that one end of the bar may move upwardly and the other end downwardly a limited distance. In use with this portion of the device the bar 58 serves as a foot-rest for the driver upon the seat 15. If the marker is not in use, the driver holds the bar 58 horizontally by applying equal pressure to both sides thereof. If he desires to mark on the right side of the machine, he simply presses the right end of the bar 58 downwardly, which obviously causes the bar 60 to tilt, so that the right marker 61 will enter the ground and the left marker be elevated.

In practical use and assuming the machine to be advancing over the ground-surface it is obvious that the furrow-opening shovel will form a furrow in the ground-surface, and the operator on the seat 18 grasps one potato at a time and places it in the opening 31 after each stroke of the arm 52. As before stated, the cutting edges of the blades upon which the potato drops are substantially V-shaped, and the potato, no matter what its size or shape, will then rest directly upon the cutting edges at the point where they cross. Then when the ends 53 move downwardly they will strike the potato and force it downwardly, thus cutting the potato into four parts, one of which is forced downwardly into each of the compartments formed by the partitions 33. As before stated, there is a slight space between the lower edges of the bar and the top edges of the partitions 33, and because the ends 53 are long enough to pass some distance beneath the lower edges of the blades 28 it is obvious that the potato-sections cannot adhere to the knife-blades, and as they have been forced from the knife-blades and dropped downwardly a short distance they will not adhere to the partitions 33, but will rest upon the flat plate 37. One of the potato-sections, however, will be thrown through the opening 38, so that only three of the potato-sections will rest upon the plate 37. Then as the said plate 37 is constantly being rotated, the opening 38 therein will successively pass under each of the compartments and permit the potato-sections to be successively dropped through the planter-leg, and as the last potato-section is dropped the operator will have placed a new potato in position and the arm 52 will have descended and severed the potato into four sections, one of which is dropped through the opening 38. By this means it is obvious that the potato-sections will be passed into the ground-surface and spaced apart all at the same distance, no matter at what speed the machine is advanced over the ground-surface.

Having thus described my invention, what I claim, and desire to secure by Letters Patent of the United States, therefore is—

1. In a potato-planter, the combination of a potato-cutting device, comprising a number of blades, the cutting edges of which extend from a common center radially and upwardly, said blades together forming a tapering pocket widest at its upper end, and a slotted plunger to pass between the blades driven upon the advance of the planter.

2. In a potato-planter, the combination with a machine-frame and supporting-wheels therefor, a stationary knife having crossed blades, a collar beneath the stationary knife having crossed bars in vertical alinement with the blades and some distance beneath them, a stationary annular bracket beneath the collar, a second collar rotatably mounted in said annular bracket and having at its top a flat plate provided with a segmental opening, said plate designed to rest against the bottom of the first collar, a cog-rim on the lower edge of the last-mentioned collar, means for rotating said cog-rim from the supporting-wheels of the machine, a slotted plunger designed to pass between the crossed knives and beneath them and means actuated by the supporting-wheels for operating said plunger in unison with the collar having the slotted plate.

3. In a potato-planter, the combination with a machine-frame and supporting-wheels therefor, a stationary knife having crossed blades, a collar beneath the stationary knife having crossed bars in vertical alinement with the blades and some distance beneath them, a stationary annular bracket beneath the collar, a second collar rotatably mounted in said annular bracket and having at its top a flat plate provided with a segmental opening, said plate designed to rest against the bottom of the first collar, a cog-rim in the lower edge of the last-mentioned collar, means for rotating said cog-rim from the supporting-wheels of the machine, a slotted plunger designed to pass between the crossed knives and beneath them, and means actuated by the supporting-wheels for operating said plunger in unison with the collar having the slotted plate, a furrow-opening shovel, means for vertically adjusting the shovel and for supporting it in different positions, a planter-leg attached to the rear of the shovel and a stationary tube beneath the slotted plate and inserted in the planter-leg, for the purposes stated.

4. A potato-planter comprising a machine-frame, supporting-wheels therefor, a knife comprising crossed blades, a collar beneath the knife having crossed partitions in vertical alinement with the crossed blades, a rotary plate having a segmental opening therein beneath the collar, a cog-rim connected with the plate for rotating it, a planter-leg beneath the cog-rim, an arm pivoted to the front of the machine-frame and having a slotted plunger at its rear end to pass between the knife-blades, a cog-wheel on the axle of the supporting-wheels, a shaft parallel therewith, a gear-wheel on one end of the said shaft meshed with the gear-wheel on the axle, and a gear-wheel on the other end of said shaft meshed with the cog-rim, a crank-shaft parallel with the axle, a gear-wheel therein meshed with the gear-wheel on the axle, and a pitman connected with the crank-arm and with said plunger-arm, substantially as and for the purposes stated.

ARTHUR W. HARVEY.

Witnesses:
J. RALPH ORWIG,
W. R. LANE.